W. H. Moore,
Grain Drill.
No. 96,825.      Patented Nov. 16, 1869.

ATTEST,
John Smith
G. Williamson

W. H. Moore
INVENTOR,
By his Attys
Knight Bros

N. PETERS, PHOTO-LITHOGRAPHER, WASHINGTON, D. C.

United States Patent Office.

WILLIAM H. MOORE, JR., OF BLOOMING GROVE, INDIANA.

Letters Patent No. 96,825, dated November 16, 1869.

IMPROVEMENT IN GRAIN-DRILLS.

The Schedule referred to in these Letters Patent and making part of the same.

*To whom it may concern:*

Be it known that I, WILLIAM H. MOORE, Jr., of Blooming Grove, Franklin county, Indiana, have invented a new and useful Improvement in Grain-Drills; and I hereby declare the following to be a full, clear, and exact description thereof, reference being had to the accompanying drawings, making part of this specification.

In the drawings—

A is the beam, which is slotted to receive the ground-wheel B, the said wheel being fast upon its axle C, which turns in boxes c upon the beam A.

One end of the axle carries a disk, D, which is perforated to receive the bent point of a connecting-rod, E, which rod has similar connection to a disk, F, at a point, f, so far removed from the axis of the disk that the rotation of the disk D causes the oscillation of the disk F.

The hole f is one of a series, and the connecting-rod E can be changed from one to another, to regulate the movement of the disk, and consequently that of the seed-slides, as hereafter explained.

The shaft of the disk F carries also a disk, G, and connecting-rods H I J communicate motion from the disks to the seed-slides K, beneath the hoppers L L' L''.

The seed-slides have side extensions k, having holes, into which the bent ends of the rods H I J enter.

The seed-slides have oblique series of perforations, k', for the measuring and passage of seed, and which, when immediately beneath the seed-cavities l l' l'', in the bottoms of the seed-hoppers, are closed at bottom by plates M.

Figure 1:
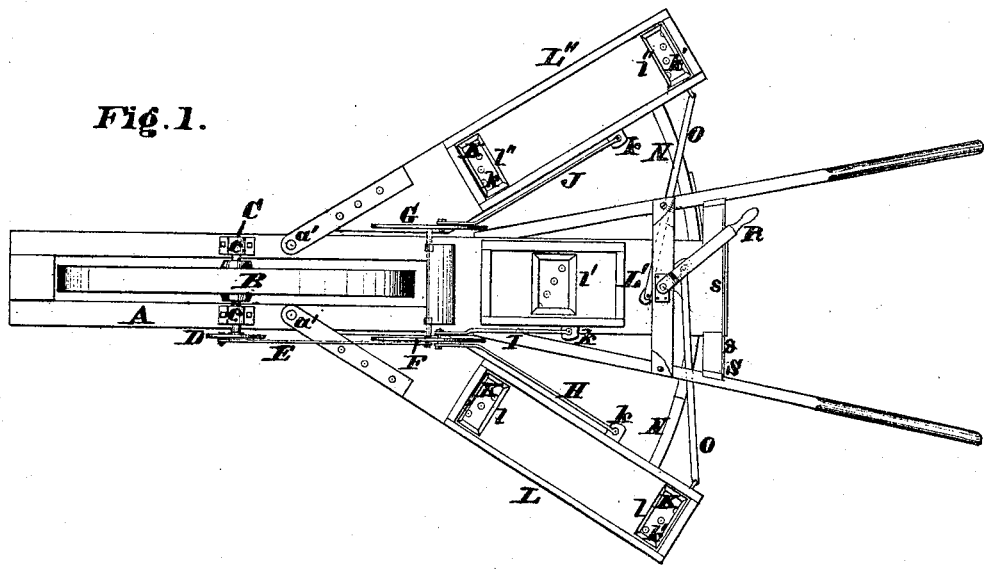
Figure 1 is a plan view of a grain-drill embodying my invention.
Figure 2:
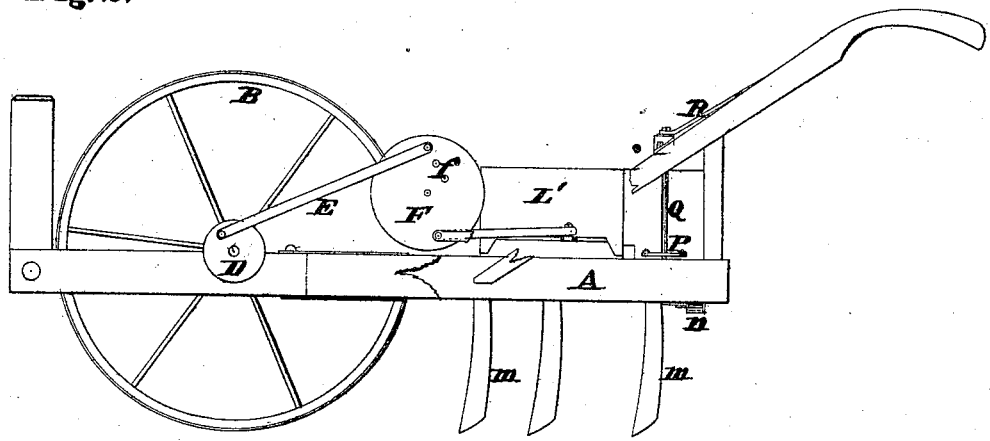
Figure 2 is a side view of the same, a portion being removed.
Figure 3:
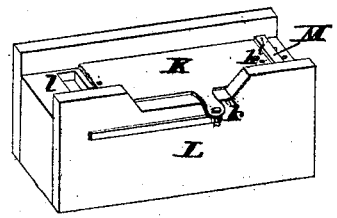
Figure 3 is a bottom view of one of the seed-hoppers.

The seed-slides, in their reciprocation, carry the seed over each side of the plates M (see fig. 3) alternately, from whence the seed drops into the spouts m, and into the furrows made for its reception.

The frames of the hoppers L L'' are pivoted (a') at their forward ends to the beam A, and carry at their rear ends slide-rods N, which are embraced by a staple, n, beneath the beam A, sliding between the staple and the beam.

These hopper-frames are connected by links O to the ends of a horizontal bar, P, whose rock-shaft Q is stepped in the beam, and has at its upper end, a lever, R, by which the bar is turned, to force the pivoted frames L L'' outward or inward.

The lever R rests on a bar, S, having square notches, s, to receive the lever and hold it to any required adjustment.

The operation of the implement is as follows:

When it is drawn forward, the rotation of the ground-wheel B causes that of the disk D, which, through the connecting-rod E, causes the oscillation of the disks F and G, and the reciprocation of the seed-slides K. The disk F has a series of holes, f, to allow the motion of all the seeding-mechanism, to be regulated by giving the disk F more or less oscillation.

When desiring to increase the width of the through, (or amount of land sown in once traversing a field,) the lever R is turned to the left, which causes the frames L L'' to move simultaneously outward from the beam A. The lever is then allowed to fall into the proper notch s in the bar S.

It will be seen that the manner of operating the seed-slides allows of this side movement of the hopper-frames L and L'' without bad effect, as the direction of the connecting-rods H and J never varies in any great degree from the plane of their operating-disks.

I claim herein as new, and of my invention—

The combination of the central hopper L', adjustable hoppers L L'', horizontal arm P, connecting-rods O O, shaft Q, and hand-lever R, with the wheel B, crank D, rods E H I J, disks F G, and seed-slides K, all constructed and arranged to operate as and for the purposes specified.

In testimony of which invention, I hereunto set my hand.

WILLIAM H. MOORE, JR.

Witnesses:
GEO. H. KNIGHT,
JAMES H. LAYMAN.